United States Patent [19]

Kallenbach

[11] Patent Number: 5,948,243

[45] Date of Patent: *Sep. 7, 1999

[54] CATALYST COMPRISING ALUMINUM BORATE AND ZIRCONIUM BORATE AND USE THEREOF IN A HYDROTREATING PROCESS

[75] Inventor: Lyle R. Kallenbach, Bartlesville, Okla.

[73] Assignee: Phillips Petroleum Company, Bartlesville, Okla.

[*] Notice: This patent issued on a continued prosecution application filed under 37 CFR 1.53(d), and is subject to the twenty year patent term provisions of 35 U.S.C. 154(a)(2).

[21] Appl. No.: 09/028,446

[22] Filed: Feb. 24, 1998

[51] Int. Cl.$^6$ ............................. C10G 45/04; B01J 21/02; B01J 23/28

[52] U.S. Cl. ................ 208/216 R; 208/217; 208/251 H; 208/254 H; 502/204; 502/206; 502/207; 502/308; 502/313; 502/314; 502/321; 502/322

[58] Field of Search .............................. 208/216 R, 217, 208/251 H, 254 H; 502/204, 206, 207, 308, 313, 314, 321, 322

[56] References Cited

U.S. PATENT DOCUMENTS

| | | | |
|---|---|---|---|
| 3,856,702 | 12/1974 | McArthur | 502/204 |
| 4,024,171 | 5/1977 | McArthur | 518/715 |
| 4,034,061 | 7/1977 | McArthur | 423/213.5 |
| 4,804,642 | 2/1989 | Ray | 501/87 |
| 5,071,539 | 12/1991 | Hayward et al. | 208/114 |
| 5,264,407 | 11/1993 | Satek et al. | 502/207 |
| 5,427,689 | 6/1995 | Kallenbach et al. | 210/670 |
| 5,461,021 | 10/1995 | Kallenbach | 502/202 |
| 5,618,407 | 4/1997 | Kallenbach et al. | 208/114 |
| 5,705,723 | 1/1998 | Kallenbach et al. | 585/270 |

*Primary Examiner*—Walter D. Griffin
*Attorney, Agent, or Firm*—Reece A. Scott

[57] ABSTRACT

A composition comprises a hydrodesulfurization or hydrodenitrogenation, or both, catalyst component and a support component which comprises aluminum, zirconium, and a borate. A process for making the composition comprises the steps of (1) contacting an aluminum salt, a zirconium salt, and an acidic boron compound under a condition sufficient to effect the production of a support component comprising aluminum, zirconium, and borate and (2) combining a hydrodesulfurization or hydrodenitrogenation, or both, catalyst component with the support component. Also disclosed are processes for removing organic sulfur compounds or organic nitrogen compounds, or both, from hydrocarbon-containing fluids which comprise contacting a hydrocarbon-containing fluid, with a hydrogen-containing fluid, in the presence of a catalyst composition.

77 Claims, No Drawings

CATALYST COMPRISING ALUMINUM BORATE AND ZIRCONIUM BORATE AND USE THEREOF IN A HYDROTREATING PROCESS

FIELD OF THE INVENTION

This invention relates to a metal borate-containing composition which can be effective as a catalyst for the hydrodesulfurization (HDS) of organic sulfur compounds and/or the hydrodenitrogenation (HDN) of organic nitrogen compounds in a hydrocarbon-containing fluid, to a process for producing the composition, and to a process for using the composition.

BACKGROUND OF THE INVENTION

Hydrodesulfurization is a process intended primarily to convert the sulfur in organic sulfur compounds to hydrogen sulfide. Hydrodenitrogenation is a process intended primarily to convert the nitrogen in organic nitrogen compounds to ammonia. Hydrodesulfurization and hydrodenitrogenation will generally occur at the same time under similar process conditions if both organic sulfur compounds and organic nitrogen compounds are present in the fluid. The hydrogen sulfide and/or ammonia can be removed from the fluid after the hydrodesulfurization and/or hydrodenitrogenation process. Hydrodesulfurization and hydrodenitrogenation are processes which are typically utilized to remove sulfur and nitrogen from a hydrocarbon-containing fluid which also contains organic sulfur compounds and/or organic nitrogen compounds to produce fuels which, when burned, will meet environmental standards. The processes may be applied to fluids other than hydrocarbon-containing fluids if organic sulfur compounds and/or organic nitrogen compounds are present and the removal of such compounds is desired.

Commercially available catalysts, such as hydrodesulfurization (HDS) catalysts, used in removing or reducing the organic sulfur compounds present in the fluids of various refining processes do not remove the sulfur completely. Therefore, it appears there is an ever-increasing need to develop a catalyst which substantially or completely removes organic sulfur compounds from hydrocarbon-containing fluids more effectively than commercially available HDS catalysts. There is also a need to develop a catalyst which removes organic sulfur compounds from hydrocarbon-containing fluids while not affecting the reduction of the concentration of aromatic compounds.

Further, it appears there is an ever-increasing need to develop a catalyst which is more effective in substantially removing organic sulfur compounds and organic nitrogen compounds from hydrocarbon-containing fluids than commercially available HDS and HDN catalysts.

SUMMARY OF THE INVENTION

An object of this invention is to substantially remove organic sulfur compounds from a hydrocarbon-containing fluid.

Another object of this invention is to substantially remove organic sulfur compounds from a hydrocarbon-containing fluid while the reduction of the concentration of the aromatic compounds in the hydrocarbon-containing fluid is not affected.

An additional object of this invention is to remove organic sulfur compounds and organic nitrogen compounds from a hydrocarbon-containing fluid more effectively than commercially available HDS and HDN catalysts.

Other objects will become apparent from the detailed description and the appended claims.

According to a first embodiment of this invention, a composition is provided which comprises a catalyst component, comprising a molybdenum compound, and a support component comprising aluminum, zirconium, and a borate.

According to a second embodiment of this invention, a process is provided which comprises combining a catalyst component, comprising a molybdenum compound, with a support component comprising aluminum, zirconium, and a borate.

According to a third embodiment of this invention, a process for the hydrodesulfurization or hydrodenitrogenation, or both, of a hydrocarbon-containing fluid which contains organic sulfur compounds or organic nitrogen compounds, or both. The process comprises contacting a hydrocarbon-containing fluid with a composition, in the presence of hydrogen. The composition comprises a catalyst component, comprising a molybdenum compound, and a support component comprising aluminum, zirconium, and a borate.

DETAILED DESCRIPTION OF THE INVENTION

The support component of the composition of this invention comprises, consists essentially of, or consists of aluminum, zirconium, and borate. Aluminum and zirconium in the composition are generally not in the metal form. Preferably the support component comprises aluminum borate and zirconium borate. More preferably the support component comprises an aluminum/zirconium/borate composition. Presently most preferred is the aluminum/zirconium/borate composition described in U.S. Pat. No. 5,461,021, the disclosure of which is incorporated herein by reference.

Generally the weight ratio of aluminum (Al) to zirconium (Zr) can be in the range of from about 2:1 to about 20:1 and preferably in the range of from about 4:1 to about 12:1. Generally the weight ratio of (Al+Zr) to B (boron) can be in the range of from about 1:1 to about 6:1 and preferably in the range of from about 1.5:1 to about 3:1. Generally, the support component has a surface area, measured by the BET (Brunauer, Emmett, Teller) method employing $N_2$, in the range of from about 150 $m^2/g$ to about 350 $m^2/g$ and a pore volume, measured by a pore size distribution method employing $N_2$, in the range of from about 0.2 cc/g to about 1.5 cc/g. The particles of this support component can have any suitable shape such as spherical, cylindrical, trilobal or irregular and can have any suitable particle size. The presently preferred particle size is in the range of from about 0.4 mm to about 0.8 mm. If particles of the support component have been compacted and extruded, the formed cylindrical extrudates generally have a diameter in the range of from about 1 mm to about 4 mm and a length in the range of from about 3 mm to about 10 mm. It is within the scope of this invention to have minor amounts of aluminum oxide and zirconium oxide, generally in the range of from about 1 weight % of each to about 5 weight % of each, present in the support component.

The catalyst component of the composition can be present in the composition of this invention in any quantity as long as that quantity can effect: the substantial removal of organic sulfur compounds in a hydrocarbon-containing fluid that contains organic sulfur compounds, the substantial removal of organic sulfur compounds in a hydrocarbon-containing fluid that contains organic sulfur compounds while not affecting the reduction of the concentration of the aromatic compounds, and/or the substantial removal of organic sulfur compounds and organic nitrogen compounds in a hydrocarbon-containing fluid that contains both organic sulfur compounds and organic nitrogen compounds. The term "fluid" is used herein to denote gas, liquid, vapor, or combinations thereof.

The catalyst component comprises, consists essentially of, or consists of a molybdenum compound. The term "molybdenum compound" includes, but is not limited to, elemental molybdenum. The catalyst component further comprises, consists essentially of, or consists of a nickel compound or cobalt compound. The term "nickel compound" includes, but is not limited to, elemental nickel. The term "cobalt compound" includes, but is not limited to, elemental cobalt.

The molybdenum compound and the nickel compound or cobalt compound are substantially converted to their oxides during the making of the finished catalyst composition. Generally, the weight % of the catalyst component (when the catalyst component comprises, consists essentially of, or consists of a molybdenum oxide compound, for example $MoO_3$, and a nickel oxide compound, for example NiO) in relation to the Al/Zr/borate support component can be in the range of from about 5 weight % to about 50 weight %, preferably in the range of from about 15 weight % to about 40 weight %, and more preferably in the range from 20 weight % to 35 weight %. Corresponding weight ratios of the catalyst component ($NiO+MoO_3$) to the support component (Al+Zr+borate) can be in the range of from about 1:20 to about 1:2, preferably in the range of from about 1:7 to about 1:2.5, and more preferably in the range from 1:5 to about 1:2.9.

Generally, the weight % of the catalyst component (when the catalyst component comprises, consists essentially of, or consists of a molybdenum oxide compound, for example $MoO_3$, and a cobalt oxide compound, for example $Co_3O_4$) in relation to the Al/Zr/borate support component can be in the range of from about 5 weight % to about 25 weight %, preferably in the range of from about 10 weight % to about 20 weight %, and more preferably in the range from 12 weight % to 18 weight %. Corresponding weight ratios of the catalyst component ($Co_3O_4+MoO_3$) to the support component (Al+Zr+borate) can be in the range of from about 1:20 to about 1:4, preferably in the range of from about 1:10 to about 1:5, and more preferably in the range from 1:8.3 to 1:5.6.

Preferably, the support component is prepared by a method comprising coprecipitation. A first aqueous solution, containing: any water-soluble aluminum salt (such as, for example, aluminum nitrate), any water-soluble zirconium salt (such as, for example zirconyl nitrate), and any water-soluble acidic boron compound (preferably a boric acid, more preferably $H_3BO_3$), is prepared. Any suitable concentrations of these compounds in the aqueous solution can be employed so long as the concentration can result in the production of the support component disclosed above. Generally, a concentration of the compounds in the aqueous solution in the range of from about 0.02 mole/l to about 1 mole/l of each compound, depending on the desired Al:Zr:B ratio, can be employed. The initial pH of this aqueous solution is generally in the range of from about 1 to about 3.

An aqueous alkaline solution, preferably an aqueous solution of ammonia containing in the range of from about 25 weight % $NH_3$ to about 28 weight % $NH_3$, generally having a pH of in the range of from about 10 to about 14, is then added to the first aqueous solution in an amount sufficient to raise the pH of the first solution to at least 7, preferably in the range of from about 8 to about 9, to afford the coprecipitation of borates of aluminum and zirconium.

The dispersion of the formed coprecipitate in the aqueous solution is then subjected to any suitable solid-liquid separation method(s) known to one skilled in the art such as, for example, filtration, to substantially separate the coprecipitate from the aqueous solution to give a separated composition, preferably a separated coprecipitate. Preferably, the separated coprecipitate is washed with water to remove adhered solution therefrom, optionally followed by washing with a water-soluble organic solvent such as methanol, ethanol, isopropanol, acetone, or combinations of two or more thereof. The presently preferred solvent is isopropanol. The separated coprecipitate, preferably washed separated coprecipitate, is generally dried by any method(s) known to one skilled in the art to give a dried composition, preferably a dried coprecipitate.

The drying step is generally carried out at a temperature in the range of from about ambient temperature to about 200° C. (preferably in the range of from about 50° C. to about 120° C.) either in air or in inert gas, either at ambient pressure conditions (about 1 atm) or under vacuum conditions. Generally, the dried composition, preferably dried coprecipitate, of the support component contains less than about 20 weight % water. The rate of drying is controlled so as to avoid surges of water vapor and splattering. Drying times can be in the range of from about 0.5 hours to about 100 hours (preferably in the range of from about 1 hour to about 30 hours). The presently preferred drying is in a vacuum oven, under any pressure, at a temperature in the range of from about 110° C. to about 180° C. for about 2 hours to about 16 hours.

The dried composition, preferably dried coprecipitate, is then calcined by any method(s) known to one skilled in the art to give a calcined composition, preferably a calcined coprecipitate. Generally, calcination can be done in air at a temperature in the range of from about 450° C. to about 550° C. for about 3 hours to about 16 hours. It is within the scope of this invention to mix the formed coprecipitate with a carbon-containing binder material, such as a polyglycol, a polyoxazoline, or carbon black, which is substantially burned off during the calcining step. It is also within the scope of this invention to extrude or pelletize or table the coprecipitate, with or without a binder, before the calcination.

The catalyst component of this invention can be combined with the support component in any suitable manner so long as the composition of this invention can be prepared. Generally, the support component is first impregnated with a dissolved molybdenum compound such as by incipient wetness impregnation (i.e., essentially completely filling the pores of the support component with a solution of the incorporating element(s)). The support component can also be sprayed with an impregnating solution containing a dissolved molybdenum compound. Generally, the concentration of the molybdenum compound in the impregnating solution is in the range of from about 0.1 gm/ml to about 1 gm/ml, preferably in the range of from about 0.2 gm/ml to about 0.5 gm/ml. The presently preferred molybdenum compound to be used in the impregnating solution is ammonium molybdate. Preferably, the solvent of the impregnating solution is water, an alcohol, such as ethanol, or combinations thereof.

Non-limiting examples of suitable molybdenum compounds which can be used for combining the catalyst component of this invention with the support component, such as by incipient wetness impregnation, include molybdenum oxides, molybdic hydroxides, molybdenum blue, molybdic acids, ammonium orthomolybdates, alkali metal orthomolybdates, ammonium heptamolybdates, alkali metal heptamolybdates, ammonium molybdates, ammonium isomolybdates, alkali metal isomolybdates, and the like and combinations thereof. It should be noted that the molybdenum compound can have any available oxidation state. For example, molybdenum can have the oxidation state of +6, +5, +4, +3, +2, or combinations of two or more thereof.

The support component may be additionally impregnated with a nickel compound or cobalt compound. Non-limiting examples of suitable nickel compounds or cobalt compounds which can be used for combining the catalyst component of this invention with the support component, such as by incipient wetness impregnation, include nickel or cobalt oxides, nitrates, sulfates, bisulfates, bicarbonates, monocarboxylates (such as acetates), di- and tricarboxylates (such as oxalates and citrates), thiocyanates, and the like and combinations thereof. It should be noted that the nickel or cobalt can have any available oxidation state. For example, nickel can have the oxidation state of −1, 0, +1, +2, +3, +4 or combinations of two or more thereof. Also for example, cobalt can have the oxidation state of −1, 0, +1, +2, +3, +4, +5 or combinations of two or more thereof.

The additional impregnation with the nickel or cobalt compound can be done before, concurrently with, or after the impregnation with the molybdenum compound. The concentration of the nickel or cobalt compound in the impregnating solution generally can be within the range disclosed above for the molybdenum compound, in the range of from about 0.1 gm/ml to about 1 gm/ml, preferably in the range of from about 0.2 gm/ml to about 0.5 gm/ml. The presently preferred nickel compound to be used in the impregnating solution is nickel nitrate. The presently preferred cobalt compound to be used in the impregnating solution is cobalt nitrate. The solvent of this impregnating solution can also be water and/or an alcohol, such as ethanol, or any other suitable liquid in which the particular nickel or cobalt compound is soluble and stable.

The molybdenum compound and the nickel or cobalt compounds are substantially converted to their oxides during the making of the finished catalyst composition. The presently preferred molybdenum oxide compound in the finished catalyst composition is $MoO_3$. The presently preferred nickel oxide compound in the finished catalyst composition is NiO. The presently preferred cobalt oxide compound in the finished catalyst composition is $Co_3O_4$. The following weight percents and weight ratios are based on these oxide compounds because these oxide compounds are more representative of the finished catalyst composition.

Generally the weight percent of the molybdenum oxide compound in relation to the finished nickel-containing catalyst composition (Al/Zr/borate support+molybdenum oxide compound+nickel oxide compound) can be in the range of from about 4 weight % to about 34 weight %, preferably in the range of from about 9 weight % to about 29 weight %, and more preferably in the range from 14 weight % to 24 weight %. Corresponding weight ratios of the molybdenum oxide compound to the finished nickel-containing catalyst composition can be in the range of from about 1:25 to about 1:2.9, preferably in the range of from about 1:11 to about 1:3.5, and more preferably in the range from 1:7 to 1:4.

Generally the weight percent of the nickel oxide compound in relation to the finished nickel-containing catalyst composition (Al/Zr/borate support+molybdenum oxide compound+nickel oxide compound) can be in the range of from about 1 weight % to about 19 weight %, preferably in the range of from about 2 weight % to about 14 weight %, and more preferably in the range from 3 weight % to 9 weight %. Corresponding weight ratios of the nickel oxide compound to the finished nickel-containing catalyst composition can be in the range of from about 1:100 to about 1:5.3, preferably in the range of from about 1:50 to about 1:7 and more preferably in the range from 1:33 to 1:11.

Generally the weight percent of the molybdenum oxide compound in relation to the finished cobalt-containing catalyst composition (Al/Zr/borate support+molybdenum oxide compound +cobalt oxide compound) can be in the range of from about 1 weight % to about 27 weight %, preferably in the range of from about 2 weight % to about 22 weight %, and more preferably in the range from 7 weight % to 17 weight %. Corresponding weight ratios of the molybdenum oxide compound to the finished cobalt-containing catalyst composition can be in the range of from about 1:100 to about 1:3.7, preferably in the range of from about 1:50 to about 1:4.6, and more preferably in the range from 1:14 to 1:6.

Generally the weight percent of the cobalt oxide compound in relation to the finished cobalt-containing catalyst composition (Al/Zr/borate support+molybdenum oxide compound+cobalt oxide compound) can be in the range of from about 0.5 weight % to about 18 weight %, preferably in the range of from about 1 weight % to about 13 weight %, and more preferably in the range from 2 weight % to 8 weight %. Corresponding weight ratios of the cobalt oxide compound to the finished cobalt-containing catalyst composition can be in the range of from about 1:200 to about 1:5.6, preferably in the range of from about 1:100 to about 1:7.7, and more preferably in the range from 1:50 to 1:13.

Generally the weight percent of the molybdenum oxide compound in relation to the nickel oxide compound (when the finished catalyst composition contains a nickel oxide compound) is in the range of from about 9 weight % to about 39 weight %, preferably in the range of from about 14 weight % to about 34 weight %, and more preferably in the range from 19 weight % to 29 weight %. Corresponding weight ratios of the molybdenum oxide compound to the nickel oxide compound (when the finished catalyst composition contains a nickel oxide compound) can be in the range of from about 1:11 to about 1:2.6, preferably in the range of from about 1:7 to about 1:3, and more preferably in the range from 1:5 to 1:3.5.

Generally the weight percent of the molybdenum oxide compound in relation to the cobalt oxide compound (when the finished catalyst composition contains a cobalt oxide compound) is in the range of from in the range of from about 7 weight % to about 37 weight %, preferably in the range of from about 12 weight % to about 32 weight %, and more preferably in the range from 17 weight % to 27 weight %. Corresponding weight ratios of the molybdenum oxide compound to the cobalt oxide compound (when the finished catalyst composition contains a cobalt oxide compound) can be in the range of from about 1:14 to about 1:2.7, preferably in the range of from about 1:8 to about 1:3.1, and more preferably in the range from 1:6 to 1:3.7.

After impregnation of the support component with the catalyst component, the resulting catalyst composition of this invention is generally dried at a temperature in the range of from about 5° C. to about 150° C. and then calcined under a condition which can be the same, or substantially the same, as the calcination of the support component disclosed above.

The calcining step can be done in an oxygen-containing atmosphere (e.g., air). During calcining, substantially all volatile matter (e.g., water and carbonaceous materials) is removed, and the compounds of molybdenum and nickel or cobalt are substantially converted to their oxides.

The resulting catalyst composition of this invention can be activated by first heating the catalyst composition for about 1 hour with $N_2$ while raising the temperature to about 400° C. The material is then heated with about 8 cc/min of $H_2$ and about 210 cc/min of a blend of about 5 volume % $H_2S$ and about 95 volume % $N_2$. The material is continually heated with the $H_2/H_2S/N_2$ blend for about 3 hours at about 400° C. At the end of the 3 hours, the $H_2$ and $H_2S$ flows are stopped, while the $N_2$ flow is maintained as a sweep as the catalyst cools to about ambient temperature (about 20° C. to about 25° C.).

The composition of matter of this invention can be used as a catalyst composition for a variety of reactions such as hydrocarbon conversion reactions. In the third embodiment of this invention, the catalyst composition of this invention is used as a catalyst for hydrotreating hydrocarbon-containing fluid which contains organic sulfur compounds and organic nitrogen compounds as impurities, and generally also oxygen, asphaltenes, coke precursors (measured as Ramsbottom carbon residue) and metal compounds. Suitable hydrocarbon-containing fluid includes crude oil and fractions thereof, petroleum products, heavy oil extracts, coal pyrolyzates, liquefied coal products, products from tar sands, shale oil and shale oil products. The catalyst composition is particularly suited for treating fluid which also contains substantial amounts of cycloalkanes, such as naphtha kerosene fractions, light gas oils, heavy gas oils, light cycle oils, heavy cycle oils, vacuum gas oils, shale oil fractions, coal tar fractions, and the like. A presently preferred fluid is light cycle oil. Another presently preferred fluid is heavy alkylate.

Generally, the hydrocarbon-containing fluid comprises, consists essentially of, or consists of sulfur in the range of from about 10 ppm sulfur to about 50,000 ppm sulfur (preferably in the range of from about 10 ppm sulfur to about 30,000 ppm sulfur). The hydrocarbon-containing fluid further comprises, consists essentially of, or consists of nitrogen in the range of from about 10 ppm nitrogen to about 20,000 ppm nitrogen (preferably in the range of from about 10 ppm nitrogen to about 10,000 ppm nitrogen).

Any suitable organic sulfur compound may be hydrodesulfurized in accordance with the present invention. Suitable organic sulfur compounds include sulfides, disulfides, mercaptans, mercaptides, thiophenes, thiophanes, thiophenols, benzothiophenes, dibenzothiophenes and the like and combinations thereof. The organic sulfur compounds commonly present in a refining process are thiophenes such as benzo[b]thiophene, methylbenzothiophene, dibenzothiophene, methyldibenzothiophene, and the like and combinations thereof. The presently preferred organic sulfur compound is benzo[b]thiophene.

Any suitable organic nitrogen compound may be hydrodenitrogenated in accordance with the present invention. Suitable organic nitrogen compounds include amines, diamines, pyridines, quinolines, porphyrines, benzoquinolines and the like and combinations thereof. These organic nitrogen compounds are commonly present in catalytically cracked gasoline streams.

The hydrodesulfurization process (hereafter referred to as HDS) or hydrodenitrogenation process (hereafter referred to as HDN) employing the catalyst composition of this invention can be carried out by any means known to one skilled in the art. The HDS/HDN process is well known to one skilled in the art. The hydrotreating process employing the catalyst composition of this invention can be carried out in any apparatus whereby an intimate contact of the catalyst composition with a hydrocarbon-containing fluid and a hydrogen-containing fluid is achieved, under such conditions as to produce a hydrocarbon-containing product having reduced or zero levels of organic sulfur compounds and organic nitrogen compounds. The HDS/HDN process can be carried out using a fixed catalyst bed (presently preferred) or a fluidized catalyst bed or a moving catalyst bed or an agitated slurry of the catalyst in the oil feed (hydrovisbreaking operation). The HDS/HDN process can be carried out as a batch process or, preferably, as a continuous process, more preferably in a tubular reactor containing one or more fixed catalyst beds or in a plurality of fixed bed reactors in parallel or in series. The hydrocarbon-containing product stream can be distilled, e.g., in a fractional distillation unit, so as to obtain fractions having different boiling ranges.

The catalyst composition of this invention can be used alone in the HDS/HDN process of this invention or may be used in combination with substantially unpromoted refractory materials such as alumina, silica, titania, magnesia, metal silicates, metal aluminates, titania and metal phosphates. Alternating layers of the refractory material and of the catalyst composition can be used, or the catalyst composition can be mixed with the refractory material. Use of the refractory material with the catalyst composition provides for better dispersion of the hydrocarbon-containing fluid. Even though presently not preferred, other catalysts such as known hydrotreating catalysts (e.g., $NiO/MoO_3$ on alumina, $Co_3O_4/MoO_3$ on alumina, and $NiO/Co_3O_4/MoO_3$ on alumina) may be used in a mixture with the catalyst composition of this invention to achieve simultaneous desulfurization and denitrogenation, if desired.

It is also within the scope of this invention to use a layer of the catalyst composition of this invention and one or more layers of these other hydrotreating catalysts in one reactor (stacked catalyst beds), or to use a reactor containing the catalyst composition of this invention in conjunction with one or more reactors in series containing these other hydrotreating catalysts, so as to achieve the simultaneous hydrotreating results as cited above.

Any suitable reaction time (contact time) between the catalyst composition, the hydrocarbon-containing fluid, and the hydrogen-containing fluid can be utilized. In general, the reaction time will be in the range of from about 0.05 hour to about 10 hours, preferably in the range of from about 0.4 hour to about 5 hours. In a continuous fixed bed operation, this generally requires a liquid hourly space velocity (LHSV) of hydrocarbon-containing fluid in the range of from about 0.10 cc of hydrocarbon-containing fluid per cc of catalyst composition per hour (cc/cc/hour) to about 10 cc/cc/hour, preferably in the range of from about 0.20 cc/cc/hour to about 5 cc/cc/hour.

The hydrotreating process employing the catalyst composition of the present invention can be carried out at any suitable temperature. The temperature will generally be in the range of from about 175° C. to about 500° C., and will preferably be in the range of from about 200° C. to about 450° C. Higher temperatures do improve the removal of impurities, but temperatures which will have adverse effects on the hydrocarbon-containing fluid, such as excessive coking, will usually be avoided. Also, economic considerations will usually be taken into account in selecting the operating temperature. Temperatures lower than about 250° C. (e.g., about 220° C.) can generally be used for lighter feeds such as naphtha streams.

Any suitable pressure may be utilized in the hydrotreating process. The reaction pressure will generally be in the range of from about atmospheric pressure (0 psig) up to about 5,000 psig. Preferably, the pressure will be in the range of from about 100 psig to about 2,500 psig. Higher pressures tend to reduce coke formation, but operation at high pressure may be undesirable for safety and economic reasons.

Any suitable quantity of hydrogen-containing fluid can be added to the hydrotreating process. The gas hourly space velocity (GHSV) of hydrogen-containing fluid will generally be in the range of from about 100 cc of hydrogen-containing fluid per cc of catalyst composition per hour (cc/cc/hour) to about 500 cc/cc/hour (preferably in the range of from about 150 cc/cc/hour to about 300 cc/cc/hour). Either pure hydrogen or a free hydrogen containing gas mixture (e.g., $H_2$ and $CH_4$, or $H_2$ and CO, or $H_2$ and $N_2$) can be used.

In general, the catalyst composition of this invention is utilized primarily for substantial desulfurization of hydrocarbon-containing fluid containing organic sulfur compounds. The catalyst composition of this invention can also be utilized for substantial desulfurization and substantial denitrogenation of hydrocarbon-containing fluid containing organic sulfur compounds and organic nitrogen compounds. The time in which the catalyst composition of this invention will maintain its activity for the above process will depend upon the hydrotreating conditions and the catalyst composition of the hydrocarbon-containing fluid.

In a preferred application, a hydrocarbon-containing fluid comprises, consists essentially of, or consists of at least one aromatic hydrocarbon as a minor component, i.e., less than about 50 weight %, preferably about 0.1 weight % to about 10 weight %, and most preferably less than 5 weight %, of the fluid, and one or more organic sulfur compounds. It is preferred that the concentration of the one or more organic sulfur compounds is about 1500 ppm sulfur or less. Any organic sulfur compound(s) that is associated with a refining process can be present in the fluid. The process comprises, consists essentially of, or consists of contacting a hydrocarbon-containing fluid which contains one or more organic sulfur compounds, in the presence of a composition, under a condition effective to substantially remove the organic sulfur compound(s).

According to the third embodiment of the invention, a process may be carried out utilizing a preferred hydrocarbon-containing fluid comprising a liquid heavy alkylate feed, from a petroleum refining process, having an American Petroleum Institute (API) gravity (measured at 60° F.) in the range of from about 52 to about 59, preferably in the range of from about 53 to about 58. Generally, the liquid heavy alkylate has an initial boiling point (ASTM D2887) of at least about 98° C., preferably has a boiling range of from about 110° C. to about 260° C., and more preferably has a boiling range of from about 130° C. to about 240° C., measured at atmospheric pressure conditions. The presence of organic sulfur compounds in this type of fluid is undesirable and the concentration of the organic sulfur compounds can be substantially removed by the hydrodesulfurization process of this invention employing the catalyst composition of this invention in a manner more effective than commercially available hydrodesulfurization catalysts. Similar to commercially available hydrodesulfurization catalyst compositions, the catalyst composition of this invention does not affect the reduction of the concentration of the aromatic compounds in the fluid.

The process of the third embodiment of this invention can be carried out under any suitable condition which can substantially reduce the concentration of the organic sulfur compounds in the hydrocarbon-containing fluid. The concentration of sulfur compounds is desirably reduced to less than about 5 parts per million (ppm) sulfur which is the X-ray fluorescence spectrometry detection limit.

Generally, the conditions can include a reaction temperature in the range of from about 177° C. to about 343° C., preferably in the range of from about 204° C. to about 316° C., and more preferably in the range from 232° C. to 288° C., a reaction pressure that can accommodate the temperatures and generally in the range of from about 300 pounds per square inch gauge (psig) to about 600 psig (preferably in the range of from about 400 psig to about 500 psig), a liquid hourly space velocity (LHSV) of the hydrocarbon-containing fluid (cc hydrocarbon-containing fluid per cc catalyst composition per hour) in the range of from about 1 cc of hydrocarbon-containing fluid per cc of catalyst composition per hour to about 5 cc of hydrocarbon-containing fluid per cc of catalyst composition per hour (cc/cc/hour) (preferably in the range of from about 1.5 cc/cc/hour to about 3 cc/cc/hour), and a gas hourly space velocity (GHSV) of hydrogen-containing fluid in the range of from about 100 cc of hydrogen-containing fluid per cc of catalyst composition per hour (cc/cc/hour) to about 500 cc/cc/hour (preferably in the range of from about 150 cc/cc/hour to about 300 cc/cc/hour). The amount of hydrogen in a hydrogen-containing fluid should be sufficient to hydrodesulfurize essentially all the sulfur compounds in the hydrocarbon-containing fluid. Generally, the hydrocarbon-containing fluid is passed, together with a hydrogen-containing fluid, through a catalyst bed containing the composition of this invention as the catalyst.

The process of the third embodiment of this invention may also be carried out utilizing a preferred hydrocarbon-containing fluid comprising a liquid light cycle oil, from a petroleum refining process, having an American Petroleum Institute (API) gravity (measured at 60° F.) in the range of from about 15 to about 20, preferably in the range of from about 16 to about 19. Generally, the light cycle oil fluid has an initial boiling point (ASTM D86) of at least about 120° C., preferably has a boiling range of from about 120° C. to about 400° C., and more preferably has a boiling range of from about 200° C. to about 350° C., measured at atmospheric pressure conditions. The presence of organic sulfur compounds and organic nitrogen compounds in this type of fluid is undesirable. The concentration of the organic sulfur compounds and organic nitrogen compounds can be reduced by the hydrodesulfurization/hydrodenitrogenation (HDS/HDN) process of this invention employing the catalyst composition of this invention in a manner which is more effective than employing the HDS/HDN catalysts commercially available.

The process of the third embodiment of this invention utilizing a light cycle oil fluid may be carried out under any suitable condition which can substantially reduce the concentration of the organic sulfur compounds and organic nitrogen compounds in the fluid. The catalyst composition of this invention removes in the range of about 5% more sulfur (about 5% of the total ppm of sulfur removed as determined by X-ray fluorescence spectrometry) than commercially available hydrodesulfurization catalysts, preferably in the range of about 10% more sulfur, and more preferably in the range of about 15% more sulfur. The catalyst composition of this invention removes in the range of about 20% more nitrogen (20% of the total ppm of nitrogen removed as determined by means of pyro-chemiluminescence) than commercially available hydrodenitrogenation catalysts, preferably in the range of about 40% more nitrogen, and more preferably in the range of about 60% more nitrogen.

Generally, the conditions can include a reaction temperature in the range of from about 232° C. to about 399° C., preferably in the range of from about 260° C. to about 371° C., and more preferably in the range from 288° C. to 343° C., a reaction pressure that can accommodate the temperatures and generally in the range of from about 200 pounds per square inch gauge (psig) to about 350 psig (preferably in the range of from about 250 psig to about 300 psig), a liquid hourly space velocity (LHSV) of the hydrocarbon-containing fluid (cc hydrocarbon-containing fluid per cc catalyst composition per hour) in the range of from about 1 cc of hydrocarbon-containing fluid per cc of catalyst composition per hour to about 5 cc of hydrocarbon-containing fluid per cc of catalyst composition per hour (cc/cc/hour) (preferably in the range of from about 1.5 cc/cc/hour to about 3 cc/cc/hour), and a gas hourly space velocity (GHSV) of hydrogen-containing fluid in the range of from about 100 cc of hydrogen-containing fluid per cc of catalyst composition per hour (cc/cc/hour) to about 500 cc/cc/hour (preferably in the range of from about 150 cc/cc/hour to about 300 cc/cc/hour).

The amount of hydrogen in a hydrogen-containing fluid should be sufficient to hydrodesulfurize and hydrodenitrogenate essentially all the organic sulfur compounds and organic nitrogen compounds in the hydrocarbon-containing fluid. Generally, the hydrocarbon-containing fluid is passed, together with a hydrogen-containing fluid, through a catalyst bed containing the composition of this invention as the catalyst.

The hydrodesulfurized or hydrodenitrogenated, or both, product which exits the hydrodesulfurization/hydrodenitrogenation zone of the third embodiment of this invention can undergo any desired separation(s) such as, for example, distillation or a series of separations to obtain various purified streams that contain reduced concentrations of organic sulfur compounds or organic nitrogen compounds, or both. The desired separation can be accomplished by any effective separation means known to one skilled in the art.

The following examples are presented to further illustrate the invention and are not to be considered as unduly limiting the scope of the invention.

EXAMPLE I

This example illustrates the preparation of various supported hydrodesulfurization/hydrodenitrogenation catalyst compositions in accordance with the preferred preparation method of this invention.

Control Catalyst A was a Haldor-Topsoe TK551 alumina-supported nickel/molybdenum catalyst which is a state of the art hydrodesulfurization catalyst. Catalyst activation procedures were initiated with a 15 minute $N_2$ flush of the catalyst-containing reactor at ambient temperature. The catalyst-containing reactor was then heated to 200° C. with continuation of the $N_2$ purge. A gas blend containing 1% $H_2$, 4% $H_2S$, 40% $CO_2$, and 55% $N_2$ was then admitted to the reactor at 200 cc/min at 300° C. for 1 hour at a pressure of 400 psig. This was continued for 4 hours at which time the temperature was dropped to 217° C. and the reactor was flushed with $H_2$.

Control Catalyst B was a Criterion 447 alumina-supported cobalt/molybdenum catalyst supplied by Criterion Catalyst Company, Houston, Tex. The Criterion 447 catalyst was activated in the same manner as described above for the Haldor-Topsoe TK551 catalyst (Control Catalyst A).

Invention Catalyst C was an alumina/zirconium/borate-supported nickel/molybdenum catalyst containing 18.6 weight % $MoO_3$ in relation to the finished nickel-containing catalyst composition (Al/Zr/borate support+molybdenum oxide compound+nickel oxide compound) and 4.4 weight % NiO in relation to the finished nickel-containing catalyst composition (Al/Zr/borate support+molybdenum oxide compound+nickel oxide compound). The weight ratio of NiO to $MoO_3$ was 0.24:1.

First, the Al/Zr/borate support component material was prepared as follows: 13.2 grams of $ZrO(NO_3)_2 \cdot 2H_2O$ (formula weight: 267) and 221.1 grams of $Al(NO_3)_3 \cdot 9H_2O$ (formula weight: 375) were mixed with 40.0 grams of $H_3BO_3$ (boric acid; formula weight: 62) and 1.0 liter of distilled water. The mixture was heated and stirred until all solids were dissolved.

Thereafter, concentrated aqueous ammonia was added to the entire mixture, which had a pH of about 2, until the pH rose to 8.4 and an Al/Zr/borate coprecipitate was formed. The filter cake was washed with about 1.5 liter of distilled water and then with 1.5 liter of isopropanol. The solid filter cake was dried at 150° C. for about 16 hours (overnight) in a vacuum oven, followed by calcining in air at 500° C. for 4 hours. The calcined Al/Zr/borate material (total 89.8 g) had a surface area, measured by the BET method using $N_2$, of 343 $m^2/g$ and a pore volume, measured by a $N_2$ pore size distribution method, of 0.5 $cm^3/g$. It contained 30.0 weight % Al, 8.4 weight % Zr and 11.0 weight % B (boron). The Al/Zr/borate support was then ground and the 20–40 mesh size fraction was retained for use.

Then, 51.9 grams of the Al/Zr/borate support component material described above was impregnated, by incipient wetness impregnation, with a solution containing 4.385 g of $(NH_4)_6Mo_7O_{24} \cdot 4H_2O$ in 20 ml of deionized water. The impregnated material was dried in a vacuum oven at 110° C. for about 2 hours. The thus-dried impregnated material was then impregnated again with a solution containing 3.30 g of $Ni(NO_3)_2 \cdot 6H_2O$ in 20 ml of deionized water. The material was dried in a vacuum oven at 110° C. for about 2 hours. The thus-dried impregnated material was then impregnated again with a solution containing 8.314 g of $Ni(NO_3)_2 \cdot 6H_2O$ and 11.0467 g of $(NH_4)_6Mo_7O_{24} \cdot 4H_2O$ in 25 ml of deionized water. The material was dried in a vacuum oven at 110° C. for about 2 hours. The material was then calcined for 4 hours at 575° C.

The resulting catalyst composition of this invention was then activated in a glass calcining tube by first heating the catalyst composition for 1 hour with $N_2$ while raising the temperature to 400° C. The material was then heated with 8 cc/min of $H_2$ and 210 cc/min of a blend of 5 volume % $H_2S$ and 95 volume % $N_2$. The material was continually heated with the $H_2/H_2S/N_2$ blend for 3 hours at 400° C. At the end of the 3 hours, the $H_2$ and $H_2S$ flows were stopped, while the $N_2$ flow was maintained as a sweep as the catalyst cooled to ambient temperature.

Invention Catalyst D was an alumina/zirconium/borate-supported cobalt/molybdenum catalyst containing 11.6 weight % $MoO_3$ in relation to the finished cobalt-containing catalyst composition (Al/Zr/borate support+molybdenum oxide compound+cobalt oxide compound) and 2.6 weight % $Co_3O_4$ in relation to the finished cobalt-containing catalyst composition (Al/Zr/borate support+molybdenum oxide compound+cobalt oxide compound). The weight ratio of $Co_3O_4$ to $MoO_3$ was 0.22:1.

First, the Al/Zr/borate support component material was prepared in the same manner as described above for Invention Catalyst C. Then 23.8 grams of the 20/40 mesh of the Al/Zr/borate support material was impregnated, by incipient wetness impregnation, with a solution containing 2.8 g of $Co(NO_3)_2 \cdot 6H_2O$ in 48 ml of deionized water. The impregnated material was dried in a vacuum oven at 110° C. for about 2 hours. The thus-dried impregnated material was then impregnated again with a solution containing 3.94 g of $(NH_4)_6Mo_7O_{24} \cdot 4H_2O$ in 36 ml of deionized water. The material was dried in a vacuum oven at 110° C. for about 2 hours. The thus-dried impregnated material was calcined for 4 hours at 575° C.

The Invention Catalyst D was activated in the same manner as described above for the Haldor-Topsoe TK551 catalyst (Control Catalyst A). The catalyst activation procedures were initiated with a 15 minute $N_2$ flush of the catalyst-containing reactor at ambient temperature. The catalyst-containing reactor was then heated to 200° C. with continuation of the $N_2$ purge. A gas blend containing 1% $H_2$, 4% $H_2S$, 40% $CO_2$, and 55% $N_2$ was then admitted to the reactor at 200 cc/min at 300° C. for 1 hour at a pressure of 400 psig. This was continued for 4 hours at which time the temperature was dropped to 217° C. and the reactor was flushed with $H_2$.

layer of 15 ml of glass beads (3 mm), a layer of glass wool, followed by 15 ml of one of the three above-described catalysts, a layer of glass wool, a layer of 15 ml of alumina A201, and a layer of 15 ml of glass beads (3 mm). Hydrogen gas was passed through the reactor at a flow rate of about 100 cc/minute. The reactor was heated to a temperature of about 204° C., and the liquid heavy alkylate feed, containing 14 ppm sulfur and about 3 weight % aromatic hydrocarbons, was passed through the reactor, concurrently with the $H_2$ stream, at a flow rate of about 0.5 cc/minute.

The hydrodesulfurized product stream, or reactor effluent, was sampled at about 1 hour intervals and was quantitatively analyzed by means of X-ray fluorescence spectrometry (known to one skilled in the art) to determine the amount of sulfur remaining in the liquid heavy alkylate feed after the feed had been contacted with the respective catalyst compositions. In addition, the trial run using Invention Catalyst C was also quantitatively analyzed by means of a gas chromatograph (known to one skilled in the art) with a sulfur specific detector. The gas chromatograph was used to verify that the <5 ppm sulfur reading, the detection limit using the X-ray technique, was actually a zero ppm sulfur reading. The difference was due to the heightened sensitivity of the gas chromatograph analysis. Test results are summarized in Table I.

TABLE I

| Catalyst | Heavy Alkylate, % Aromatic Conversion | Amount of S in Alkylate Feed (in ppm of S) before contact with catalyst | Amount of S in Alkylate Feed (in ppm of S) after contact with catalyst | % of S Removed |
|---|---|---|---|---|
| Control A (Haldor-Topsoe TK551) | 42 | 14 | 7 (by X-ray analysis) | 50 |
| Invention C | 42 | 14 | <5 (by X-ray analysis) 0 (by gas chromatograph)* | 100 |
| Invention D | 42 | 14 | <5 (by X-ray analysis)* | 100 |

*When the sulfur levels are <5 ppm (i.e., trace levels), the accuracy of the X-ray fluorescence spectrometry analysis only allows for a <5 ppm reading (i.e., a <5 ppm sulfur level reading is the X-ray fluorescence spectrometry detection limit). However, the heightened sensitivity of the gas chromatograph with a sulfrr specific detector verifies that the <5 ppm reading of the X-ray analysis is actually a 0 ppm reading.

EXAMPLE II

This example illustrates the use of Control Catalyst A, Invention Catalyst C, and Invention Catalyst D (all described in Example I) for the removal of organic sulfur compounds contained in a hydrocarbon-containing fluid. The hydrocarbon-containing fluid initially comprised 3004 g of a liquid heavy alkylate feed containing primarily $C_9$–$C_{17}$ isoparaffins (97.5 weight %) produced by Phillips Chemical Company, Borger, Tex., with no organic sulfur compounds or organic nitrogen compounds. The liquid heavy alkylate feed had an American Petroleum Institute (API) gravity (measured at 60° F.) in the range of from about 53 to about 58. The liquid heavy alkylate feed had an initial boiling point (ASTM D2887) of about 98° C. and a boiling range of about 130° C. to about 240° C., measured at atmospheric pressure conditions. To the liquid heavy alkylate feed was added 0.1749 g of benzo[b]thiophene (BTP). This produced a liquid heavy alkylate feed containing 58.2 ppm BTP (14 ppm sulfur). This liquid heavy alkylate feed contained about 3.0 weight % aromatic hydrocarbons having about 9 carbon atoms per molecule to about 17 carbon atoms per molecule.

A stainless steel reactor tube (inner diameter: 0.5 inch; length: 18 inches) was filled with a layer of glass wool, a Test data in Table I clearly show that Invention Catalysts C and D removed 50% more sulfur than the commercially available catalyst Control A. The test data also shows that the invention catalysts did not affect the heavy alkylate conversion (i.e., reduction of aromatic compound concentration) as compared to the commercially available hydrodesulfurization catalyst.

EXAMPLE III

This example illustrates that Invention Catalyst D is more effective in removing organic sulfur compounds and organic nitrogen compounds from a hydrocarbon-containing fluid than the commercially available Control Catalyst B.

The hydrocarbon-containing fluid initially comprised a liquid light cycle oil produced by Phillips Chemical Company, Borger, Tex. The liquid light cycle oil had an American Petroleum Institute (API) gravity (measured at 60° F.) in the range of from about 16 to about 19. The liquid light cycle oil had an initial boiling point (ASTM D86) of about 120° C. and a boiling range of about 200° C. to about 350° C., measured at atmospheric pressure conditions. The liquid light cycle oil initially contained 1300 ppm of sulfur and 480 ppm of nitrogen.

A stainless steel reactor tube (inner diameter: 0.5 inch; length: 18 inches) was filled with a layer of glass wool, a layer of 15 ml of glass beads (3 mm), a layer of glass wool, followed by 15 ml of one of the two above-described catalysts, a layer of glass wool, a layer of 15 ml of alumina A201, and a layer of 15 ml of glass beads (3 mm). Hydrogen gas was passed through the reactor at a flow rate of about 100 cc/minute. The reactor was heated to a temperature of about 204° C. and the liquid light cycle oil, containing 1300 ppm sulfur and 480 ppm nitrogen, was passed through the reactor, concurrently with the hydrogen stream, at a flow rate of about 1.5 cc/minute.

The hydrodesulfurized/hydrodenitrogenated product stream, or reactor effluent, was sampled at about 1 hour intervals. The samples were quantitatively analyzed by means of X-ray fluorescence spectrometry to determine the amount of sulfur remaining in the liquid light cycle oil after such light cycle oil had been contacted with the respective catalyst compositions. The samples were also quantitatively analyzed by means of pyro-chemiluminescence (known to one skilled in the art) to determine the amount of nitrogen remaining in the liquid light cycle oil after such light cycle oil had been contacted with the respective catalyst compositions. Test results are summarized in Table II.

TABLE II

| Catalyst | Amount of S in Light Cycle Oil (in ppm of S) before contact with catalyst | Amount of S in Light Cycle Oil (in ppm of S) after contact with catalyst | Amount of N in Light Cycle Oil (in ppm of N) before contact with catalyst | Amount of N in Light Cyele Oil (in ppm of N) after contact with catalyst | % of S Removed | % of N Removed |
|---|---|---|---|---|---|---|
| Control B Criterion 447 | 1300 | 185 | 480 | 360 | 86 | 25 |
| Invention D | 1300 | 80 | 480 | 197 | 94 | 59 |

Test data in Table II clearly show that Invention Catalyst D removed more sulfur and substantially more nitrogen than the commercially available catalyst Control B. In addition, the test data shows that the invention catalyst removed approximately 8% more sulfur and approximately 34% more nitrogen than the commercially available catalyst Control B.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

What is claimed is:

1. A composition comprising a catalyst component comprising a molybdenum compound and a support component wherein said support component comprises aluminum borate and zirconium borate.

2. A composition according to claim 1, wherein the weight ratio of aluminum to zirconium in said support component is in the range of from about 2:1 to about 20:1 and the weight ratio of (aluminum+zirconium) to boron in said support component is in the range of from about 1:1 to about 6:1.

3. A composition according to claim 1, wherein the weight ratio of aluminum to zirconium in said support component is in the range of from about 4:1 to about 12:1 and the weight ratio of (aluminum+zirconium) to boron in said support component is in the range of from about 1.5:1 to about 3:1.

4. A composition according to claim 1, wherein said catalyst component further comprises a nickel compound.

5. A composition according to claim 4, wherein said molybdenum compound is selected from the group consisting of molybdenum oxides, molybdic hydroxides, molybdenum blue, molybdic acids, ammonium orthomolybdates, alkali metal orthomolybdates, ammonium heptamolybdates, alkali metal heptamolybdates, ammonium molybdates, ammonium isomolybdates, alkali metal isomolybdates, and combinations thereof, and said nickel compound is selected from the group consisting of nickel oxides, nickel nitrates, nickel sulfates, nickel bisulfates, nickel bicarbonates, nickel monocarboxylates, nickel di- and tricarboxylates, nickel thiocyanates, and combinations thereof.

6. A composition according to claim 5, wherein said molybdenum compound comprises a molybdenum oxide compound, and said nickel compound comprises a nickel oxide compound.

7. A composition according to claim 6, wherein said molybdenum oxide compound is $MoO_3$, and said nickel oxide compound is NiO.

8. A composition according to claim 7, wherein the weight ratio of said $MoO_3$ to said NiO in said catalyst component is in the range of from about 1:11 to about 1:2.6, and the weight ratio of said catalyst component to said support component is in the range of from about 1:20 to about 1:2.

9. A composition according to claim 1, wherein said catalyst component further comprises a cobalt compound.

10. A composition according to claim 9, wherein said molybdenum compound is selected from the group consisting of molybdenum oxides, molybdic hydroxides, molybdenum blue, molybdic acids, ammonium orthomolybdates, alkali metal orthomolybdates, ammonium heptamolybdates, alkali metal heptamolybdates, ammonium molybdates, ammonium isomolybdates, alkali metal isomolybdates, and combinations thereof, and said cobalt compound is selected from the group consisting of cobalt oxides, cobalt nitrates, cobalt sulfates, cobalt bisulfates, cobalt bicarbonates, cobalt monocarboxylates, cobalt di- and tricarboxylates, cobalt thiocyanates, and combinations thereof.

11. A composition according to claim 10, wherein said molybdenum compound comprises a molybdenum oxide compound, and said cobalt compound comprises a cobalt oxide compound.

12. A composition according to claim 11, wherein said molybdenum oxide compound is $MoO_3$, and said cobalt oxide compound is $Co_3O_4$.

13. A composition according to claim 12, wherein the weight ratio of said $MoO_3$ to said $Co_3O_4$ in said catalyst component is in the range of from about 1:14 to about 1:2.7, and the weight ratio of said catalyst component to said support component is in the range of from about 1:20 to about 1:4.

14. A process for making a composition comprising: combining a catalyst component comprising a molybdenum compound with a support component wherein said support component comprises aluminum borate and zirconium borate.

15. A process according to claim 14, wherein the weight ratio of aluminum to zirconium in said support component is in the range of from about 2:1 to about 20:1 and the weight ratio of (aluminum+zirconium) to boron in said support component is in the range of from about 1:1 to about 6:1.

16. A process according to claim 14, wherein the weight ratio of aluminum to zirconium in said support component is in the range of from about 4:1 to about 12:1 and the weight ratio of (aluminum+zirconium) to boron in said support component is in the range of from about 1.5:1 to about 3:1.

17. A process according to claim 14, wherein said catalyst component further comprises a nickel compound.

18. A process according to claim 17, wherein said molybdenum compound is selected from the group consisting of molybdenum oxides, molybdic hydroxides, molybdenum blue, molybdic acids, ammonium orthomolybdates, alkali metal orthomolybdates, ammonium heptamolybdates, alkali metal heptamolybdates, ammonium molybdates, ammonium isomolybdates, alkali metal isomolybdates, and combinations thereof, and said nickel compound is selected from the group consisting of nickel oxides, nickel nitrates, nickel sulfates, nickel bisulfates, nickel bicarbonates, nickel monocarboxylates, nickel di- and tricarboxylates, nickel thiocyanates, and combinations thereof.

19. A process according to claim 18, wherein
said molybdenum compound comprises a molybdenum oxide compound, and
said nickel compound comprises a nickel oxide compound.

20. A process according to claim 19, wherein
said molybdenum oxide compound is $MoO_3$, and
said nickel oxide compound is NiO.

21. A process according to claim 20, wherein
the weight ratio of said $MoO_3$ to said NiO in said catalyst component is in the range of from about 1:11 to about 1:2.6, and
the weight ratio of said catalyst component to said support component is in the range of from about 1:20 to about 1:2.

22. A process according to claim 14, wherein said catalyst component further comprises a cobalt compound.

23. A process according to claim 22, wherein said molybdenum compound is selected from the group consisting of molybdenum oxides, molybdic hydroxides, molybdenum blue, molybdic acids, ammonium orthomolybdates, alkali metal orthomolybdates, ammonium heptamolybdates, alkali metal heptamolybdates, ammonium molybdates, ammonium isomolybdates, alkali metal isomolybdates, and combinations thereof, and said cobalt compound is selected from the group consisting of cobalt oxides, cobalt nitrates, cobalt sulfates, cobalt bisulfates, cobalt bicarbonates, cobalt monocarboxylates, cobalt di- and tricarboxylates, cobalt thiocyanates, and combinations thereof.

24. A process according to claim 23, wherein
said molybdenum compound comprises a molybdenum oxide compound, and
said cobalt compound comprises a cobalt oxide compound.

25. A process according to claim 24, wherein
said molybdenum oxide compound is $MoO_3$, and
said cobalt oxide compound is $Co_3O_4$.

26. A process according to claim 25, wherein
the weight ratio of said $MoO_3$ to said $Co_3O_4$ in said catalyst component is in the range of from about 1:14 to about 1:2.7, and
the weight ratio of said catalyst component to said support component is in the range of from about 1:20 to about 1:4.

27. A process for making a composition comprising
(a) adding an alkaline solution to an aqueous solution, wherein said aqueous solution comprises at least one aluminum salt, at least one zirconium salt, and at least one acidic boron compound, so as to raise the pH sufficiently to form a coprecipitate comprising aluminum borate and zirconium borate,
(b) separating said coprecipitate from said aqueous solution to give a separated coprecipitate,
(c) drying said separated coprecipitate to give a dried coprecipitate,
(d) calcining said dried coprecipitate at a temperature in the range of from about 450° C. to about 550° C. to give a calcined coprecipitate, and
(e) combining said calcined coprecipitate with a catalyst component comprising a molybdenum compound.

28. A process according to claim 27, wherein
said aluminum salt is aluminum nitrate,
said zirconium salt is zirconyl nitrate, and
said acidic boron compound is boric acid.

29. A process according to claim 27, wherein
said combining step (e) further comprises impregnating said calcined coprecipitate with said catalyst component by incipient wetness impregnation.

30. A process according to claim 27, wherein
said combining step (e) further comprises impregnating said calcined coprecipitate with an impregnating solution wherein said impregnating solution comprises said molybdenum compound, a nickel compound, and a solvent.

31. A process according to claim 30, wherein
the concentration of said molybdenum compound in said impregnating solution is in the range of from about 0.1 gm/ml to about 1 gm/ml, and
the concentration of said nickel compound in said impregnating solution is in the range of from about 0.1 gm/ml to about 1 gm/ml.

32. A process according to claim 31, wherein
said solvent is selected from the group consisting of water, alcohol, and combinations thereof.

33. A process according to claim 27, wherein
said combining step (e) further comprises impregnating said calcined coprecipitate with an impregnating solution wherein said impregnating solution comprises said molybdenum compound, a cobalt compound, and a solvent.

34. A process according to claim 33, wherein
the concentration of said molybdenum compound in said impregnating solution is in the range of from about 0.1 gm/ml to about 1 gm/ml, and
the concentration of said cobalt compound in said impregnating solution is in the range of from about 0.1 gm/ml to about 1 gm/ml.

35. A process according to claim 34, wherein
said solvent is selected from the group consisting of water, alcohol, and combinations thereof.

36. A process comprising contacting a hydrocarbon-containing fluid with a catalyst composition, in the presence of a hydrogen-containing fluid, at hydrotreating conditions wherein said catalyst composition comprises a catalyst component comprising a molybdenum compound, and a support component wherein said support component comprises aluminum borate and zirconium borate.

37. A process according to claim 36, wherein the weight ratio of aluminum to zirconium in said support component is in the range of from about 2:1 to about 20:1 and the weight ratio of (aluminum+zirconium) to boron in said support component is in the range of from about 1:1 to about 6:1.

38. A process according to claim 36, wherein the weight ratio of aluminum to zirconium in said support component is in the range of from about 4:1 to about 12:1 and the weight ratio of (aluminum+zirconium) to boron in said support component is in the range of from about 1.5:1 to about 3:1.

39. A process according to claim 36, wherein said catalyst component further comprises a nickel compound.

40. A process according to claim 39, wherein said molybdenum compound is selected from the group consisting of molybdenum oxides, molybdic hydroxides, molybdenum blue, molybdic acids, ammonium orthomolybdates, alkali metal orthomolybdates, ammonium heptamolybdates, alkali metal heptamolybdates, ammonium molybdates, ammonium isomolybdates, alkali metal isomolybdates, and combinations thereof, and said nickel compound is selected from the group consisting of nickel oxides, nickel nitrates, nickel sulfates, nickel bisulfates, nickel bicarbonates, nickel monocarboxylates, nickel di- and tricarboxylates, nickel thiocyanates, and combinations thereof.

41. A process according to claim 40, wherein
said molybdenum compound comprises a molybdenum oxide compound, and said nickel compound comprises a nickel oxide compound.

42. A process according to claim 41, wherein
said molybdenum oxide compound is $MoO_3$, and
said nickel oxide compound is NiO.

43. A process according to claim 42, wherein
the weight ratio of said $MoO_3$ to said NiO in said catalyst component is in the range of from about 1:11 to about 1:2.6, and
the weight ratio of said catalyst component to said support component is in the range of from about 1:20 to about 1:2.

44. A process according to claim 36, wherein said catalyst component further comprises a cobalt compound.

45. A process according to claim 44, wherein said molybdenum compound is selected from the group consisting of molybdenum oxides, molybdic hydroxides, molybdenum blue, molybdic acids, ammonium orthomolybdates, alkali metal orthomolybdates, ammonium heptamolybdates, alkali metal heptamolybdates, ammonium molybdates, ammonium isomolybdates, alkali metal isomolybdates, and combinations thereof, and said cobalt compound is selected from the group consisting of cobalt oxides, cobalt nitrates, cobalt sulfates, cobalt bisulfates, cobalt bicarbonates, cobalt monocarboxylates, cobalt di- and tricarboxylates, cobalt thiocyanates, and combinations thereof.

46. A process according to claim 45, wherein
said molybdenum compound comprises a molybdenum oxide compound, and
said cobalt compound comprises a cobalt oxide compound.

47. A process according to claim 46, wherein
said molybdenum oxide compound is $MoO_3$, and
said cobalt oxide compound is $Co_3O_4$.

48. A process according to claim 47, wherein
the weight ratio of said $MoO_3$ to said $Co_3O_4$ in said catalyst component is in the range of from about 1:14 to about 1:2.7, and
the weight ratio of said catalyst component to said support component is in the range of from about 1:20 to about 1:4.

49. A process according to claim 36, wherein said contacting is at
a temperature in the range of from about 175° C. to about 500° C.,
a reaction pressure in the range of from about 0 psig to about 5,000 psig,
a liquid hourly space velocity of said hydrocarbon-containing fluid in the range of from about 0.10 cc of said hydrocarbon-containing fluid per cc of said catalyst composition per hour to about 10 cc of said hydrocarbon-containing fluid per cc of said catalyst composition per hour,
a gas hourly space velocity of said hydrogen-containing fluid in the range of from about 100 cc of said hydrogen-containing fluid per cc of said catalyst composition per hour to about 500 cc of said hydrogen-containing fluid per cc of said catalyst composition per hour, and
a reaction time in the range of from about 0.05 hour to about 10 hours.

50. A process according to claim 36, wherein said contacting is at
a temperature in the range of from about 200° C. to about 450° C.,
a reaction pressure in the range of from about 100 psig to about 2,500 psig,
a liquid hourly space velocity of said hydrocarbon-containing fluid in the range of from about 0.20 cc of said hydrocarbon-containing fluid per cc of said catalyst composition per hour to about 5 cc of said hydrocarbon-containing fluid per cc of said catalyst composition per hour,
a gas hourly space velocity of said hydrogen-containing fluid in the range of from about 150 cc of said hydrogen-containing fluid per cc of said catalyst composition per hour to about 300 cc of said hydrogen-containing fluid per cc of said catalyst composition per hour, and
a reaction time in the range of from about 0.4 hour to about 5 hours.

51. A process according to claim 36, wherein said hydrocarbon-containing fluid further comprises an organic sulfur compound.

52. A process according to claim 51, wherein said hydrocarbon-containing fluid further comprises an organic nitrogen compound.

53. A process according to claim 51, wherein said organic sulfur compound is selected from the group consisting of sulfides, disulfides, mercaptans, mercaptides, thiophenes, thiophanes, thiophenols, benzothiophenes, dibenzothiophenes and combinations thereof.

54. A process according to claim 53, wherein said organic sulfur compound is benzo[b]thiophene.

55. A process according to claim 52, wherein said organic nitrogen compound is selected from the group consisting of amines, diamines, pyridines, quinolines, porphyrines, benzoquinolines and combinations thereof.

56. A product prepared by the process of claim 14.
57. A product prepared by the process of claim 15.
58. A product prepared by the process of claim 16.
59. A product prepared by the process of claim 17.
60. A product prepared by the process of claim 18.
61. A product prepared by the process of claim 19.
62. A product prepared by the process of claim 20.
63. A product prepared by the process of claim 21.
64. A product prepared by the process of claim 22.
65. A product prepared by the process of claim 23.
66. A product prepared by the process of claim 24.
67. A product prepared by the process of claim 25.
68. A product prepared by the process of claim 26.
69. A product prepared by the process of claim 27.
70. A product prepared by the process of claim 28.
71. A product prepared by the process of claim 29.
72. A product prepared by the process of claim 30.
73. A product prepared by the process of claim 31.
74. A product prepared by the process of claim 32.
75. A product prepared by the process of claim 33.
76. A product prepared by the process of claim 34.
77. A product prepared by the process of claim 35.

* * * * *